(12) United States Patent
Chikuma et al.

(10) Patent No.: US 7,055,924 B2
(45) Date of Patent: Jun. 6, 2006

(54) RECORDING SYSTEM CAPABLE OF RECORDING INFORMATION REPRESENTING POSITIONS ON A RECORDING MEDIUM AND RECORDING METHOD

(75) Inventors: Toshiyuki Chikuma, Ohta-ku (JP); Jiro Moriyama, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 10/715,652

(22) Filed: Nov. 17, 2003

(65) Prior Publication Data

US 2004/0095433 A1 May 20, 2004

(30) Foreign Application Priority Data

Nov. 19, 2002 (JP) ............................. 2002/335770

(51) Int. Cl.
*B41J 2/205* (2006.01)

(52) U.S. Cl. ............................. 347/15; 347/16; 358/1.2

(58) Field of Classification Search ................. 347/15, 347/16, 43, 41, 14; 358/1.2, 1.9
See application file for complete search history.

(56) References Cited

U.S. PATENT DOCUMENTS 6,290,330 B1 * 9/2001 Torpey et al. ................ 347/43
6,435,640 B1 * 8/2002 Yamaguchi ................... 347/15

* cited by examiner

*Primary Examiner*—Lamson Nguyen
(74) *Attorney, Agent, or Firm*—Canon USA, Inc. IP Division

(57) ABSTRACT

When positional information expressed by a black dot pattern and an image other than the positional information recorded as color dots are recorded, black data and color (cyan, magenta, and yellow) data are compared. If the black dots and color dots are provided in the same positions, data conversion is performed so that color dots corresponding to those positions are not formed. Thus, bleeding resulting from overlaps of positional information image with the other image is reduced to prevent the degradation of recording quality, and waste of ink is prevented.

15 Claims, 6 Drawing Sheets

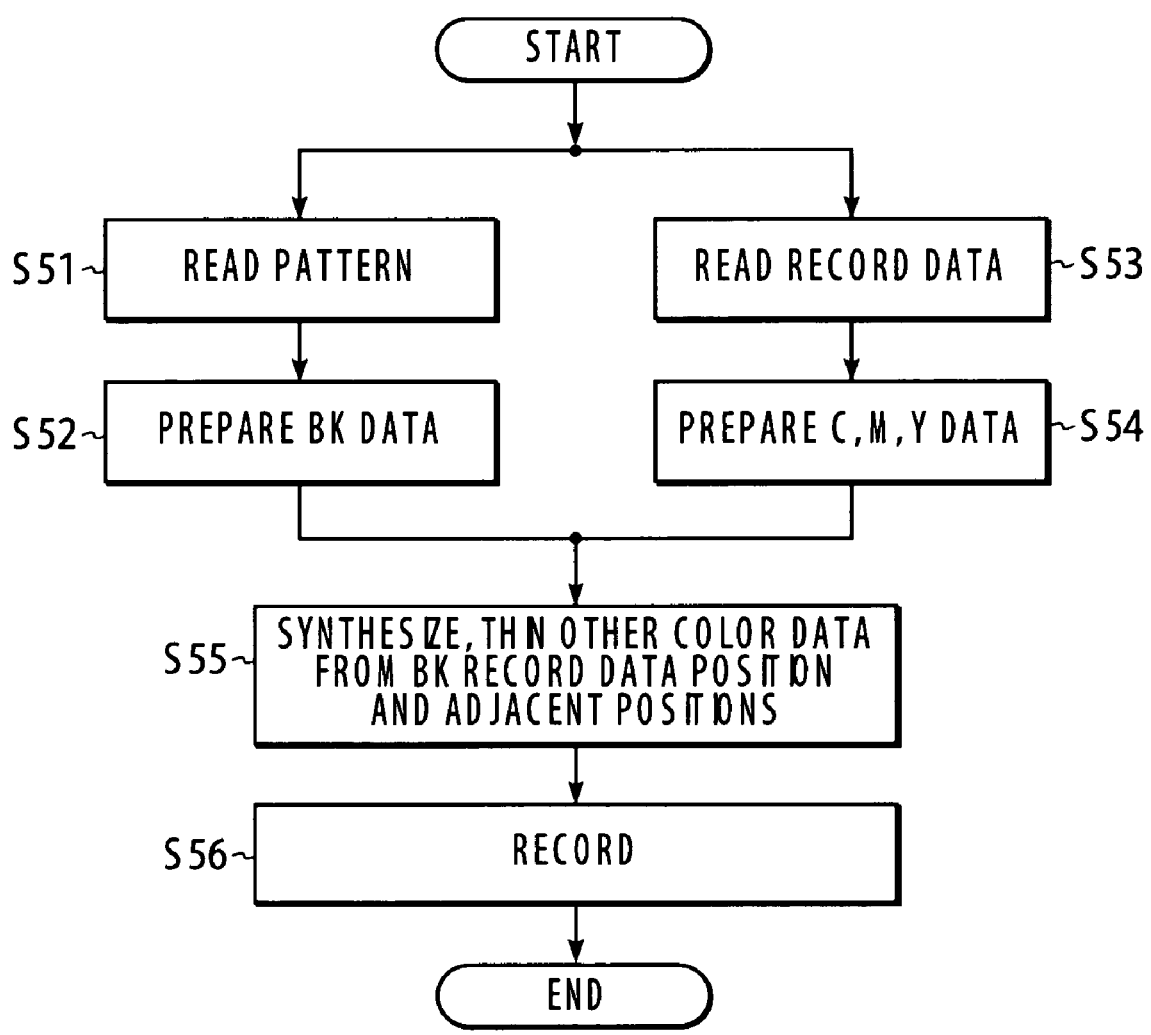

RECORDING SYSTEM CAPABLE OF RECORDING INFORMATION REPRESENTING POSITIONS ON A RECORDING MEDIUM AND RECORDING METHOD

BACKGROUND OF THE INVENTION

1. Field of the Invention

The present invention relates to recording methods, and particularly to a method for recording an image representing predetermined positional information and an ordinary image on the same recording medium.

2. Description of the Related Art

Recording apparatuses have been generally known which use a plurality of color inks including cyan (C), magenta (M) and yellow (Y), and further black (Bk).

On the other hand, as a recording medium capable of handwriting thereon, a type has been known over which positional information has been previously printed. This positional information includes information designating the position where the positional information is recorded on the recording medium, that is, information whose recording position is associated with coordinates on the recording medium. The positional information is, for example, expressed by a combination pattern of a plurality of black spots recorded on the recording area.

For handwriting characters and the like on such a recording medium including positional information recorded thereon, a pen integrated with a miniature camera capable of detecting and recording images is used. The camera detects the black spot pattern on the recording medium at the vicinity of the pen point. Thus, the character position and the characters, which is on the locus of pen movement, are recognized from the pattern. The recognition of the handwritten characters and the like may be carried out by an information processor, such as a personal computer, to which the signal detected by the camera is transmitted by, for example, radio communication. This technique for inputting handwritten characters and the like with a pen is hereinafter referred to as "pen input method" in some cases.

However, since the above-described positional information has previously been printed on a recording medium, users must purchase, for example, recording medium with the positional information printed thereover. Consequently, positional information cannot be arbitrarily recorded on the recording medium. For example, the shape, size, relative position and so on of the region identifying a handwriting position cannot be flexibly set. Furthermore, if an image is recorded on a recording medium with the positional information printed thereon using a recording apparatus, the image prevents the positional information from being read. Thus the positional information may not function undesirably. Users cannot record an arbitrary image on a recording medium with the positional information printed thereon using a recording apparatus.

The positional information can be recorded by a recording apparatus. In this instance, however, overlaps between a positional information image and the other image may negatively affect the recording quality of the image or result in waste of color materials such as ink.

SUMMARY OF THE INVENTION

Accordingly, an object of the present invention is to provide a recording system capable of arbitrarily recording the positional information and images.

In particular, the present invention is intended to solve the above-described problems, and accordingly to provide a system and a method for recording the positional information and images on a recording medium while preventing waste of color materials and degradation of recording quality.

According to an aspect of the present invention, there is provided a method for recording, on the same recording medium, an image representing positional information corresponding to at least positions on the recording medium and an image other than the positional information, using a recording apparatus that applies a recording material onto the recording medium. The method includes the step of obtaining dot data of a color material forming the positional information image, according to record data for recording the positional information image. In a data conversion step, dot data of a color material forming the other image is converted so that the dot density of the other image is reduced, on the basis of the dot data of the color material forming the positional information. The method also includes the step of recording the images on the recording medium, according to the record data of the positional information image and the converted data of the other image.

Accordingly, the color dot data of a color material forming an image other than positional information image is converted on the basis of the dot data of a color material forming the positional information image so that the dot density of the ordinary image is reduced. Thus, overlapping or adjoining of the ordinary image dots and the positional information image dots can be reduced.

As a result, waste of color materials, such as ink, can be prevented when, for example, it is not much useful that positional information image dots are formed with black color in such a manner as to overlap with dots of the other colors. In addition, if inks are used as the color materials forming the positional information image dots and the other image dots, bleeding between the inks and cockling of recording paper can be prevented.

Further objects, features and advantages of the present invention will become apparent from the following description of the preferred embodiments (with reference to the attached drawings).

BRIEF DESCRIPTION OF THE DRAWINGS

FIG. 7 is a flow chart of a procedure of image processing according to an embodiment of the present invention.

DESCRIPTION OF THE PREFERRED EMBODIMENTS

Preferred embodiments of the present invention will now be described with reference to the drawings.

First Embodiment

Figure 1:
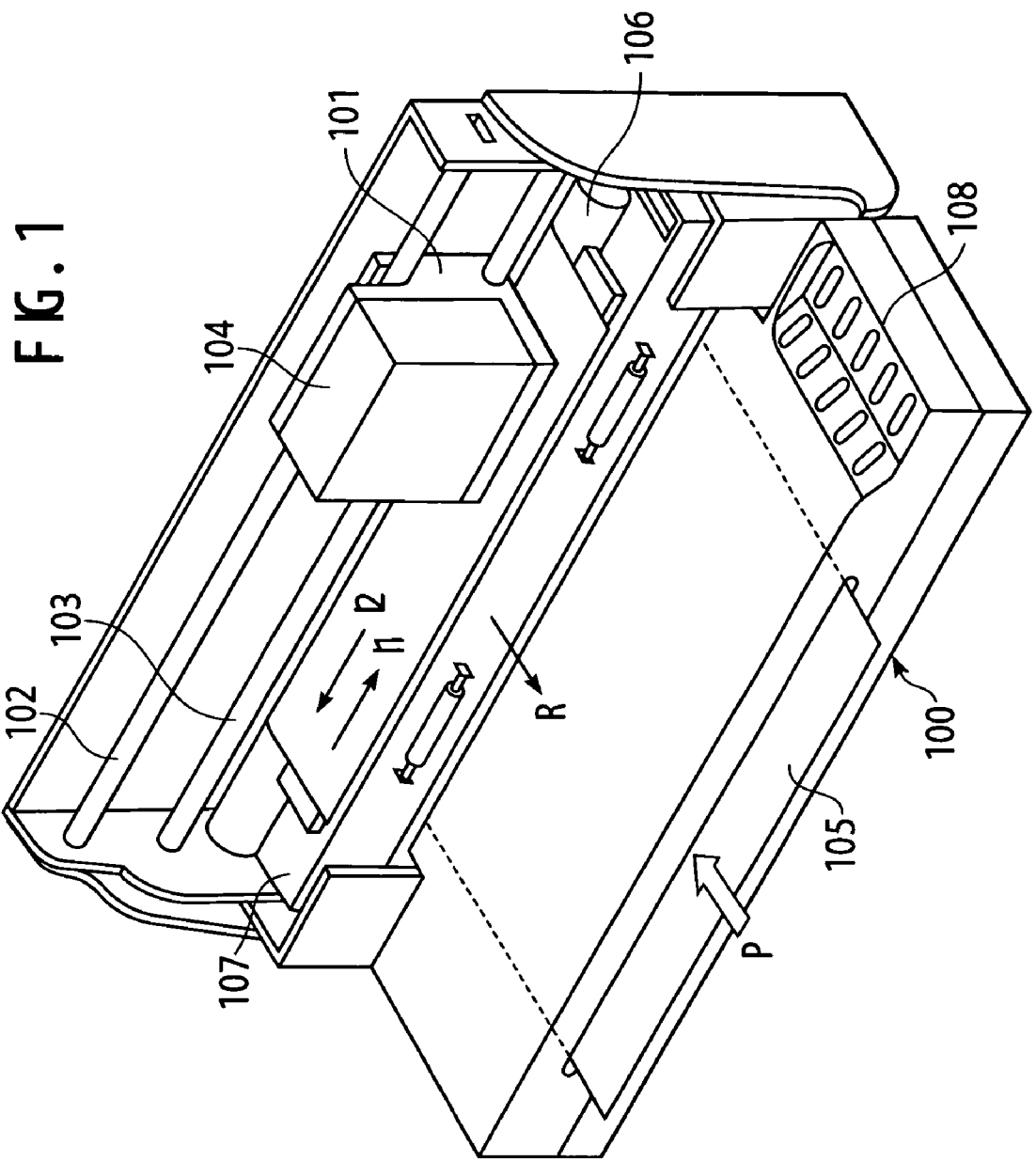
FIG. 1 is a representation of an ink jet recording apparatus used in the present invention as a recording apparatus.

In the first embodiment, the present invention will be described using an ink jet recording apparatus, which discharges ink onto a recording medium. FIG. 1 shows the structure of the ink jet recording apparatus of the present invention.

A recording medium 105 is fed in the direction designated by arrow P from a feeding position in the front of an ink jet recording apparatus (printer, in the first embodiment) 100. The feed direction of the recording medium 105 is reversed at the back of the recording apparatus 100, and the recording medium 105 is delivered in a secondary scanning direction, designated by arrow R, to a recordable area of a recording head 104, by a delivery roller 106. Under the recording medium 105 in the recordable area, a platen 107 is disposed. A carriage 101 shifts in primary scanning directions, designated by arrows I1 and I2, along guide axes 102 and 103, and thus reciprocally scans the scan area including the recordable area by driving a stepping motor, not shown in the figure. The carriage 101 holds the recording head 104 capable of discharging ink from discharge holes. After the recording head 104 has finished one primary scan, the recording medium 105 is delivered a predetermined distance in the secondary scanning direction R and prepares for the next primary scan. By repeating the primary scan and secondary scan, an image is recorded on a sheet of the recording medium 105.

The recording head 104 is detachably or integrally combined with an ink reservoir (not shown) containing ink to constitute an ink jet cartridge. The recording head 104 records an image on the recording medium 105 by discharging the ink supplied from the ink reservoir from the discharge holes in the downward direction of the figure. Reference numeral 108 designates a portion where switches and a display portion are disposed. The switch portion is used for switching power on/off, recording modes, and the like. The display portion is structured so as to display the state of the recording apparatus.

The recording head 104 can discharge inks of four colors Y (yellow), M (magenta), C (cyan), and Bk (black). The Y, M, C inks are each discharged from 128 discharge holes, and the Bk ink is discharged from 320 discharge holes. The discharge holes of each color ink are aligned in the secondary scanning direction with a pitch of about 42 μm, equivalent to 1/600 dpi (dots per inch). The recording head 104 includes a heater being an electrothermal converter for each discharge hole. The heater generates thermal energy to bubble ink so that the ink is discharged by bubble pressure. The recording head 104 operates at a frequency of 15 kHz and it can record at a density of 600 dpi in the primary scanning direction. Hence, the shifting speed in the primary scanning direction of the carriage 101 is 25 in/s (inches per second).

The Bk ink comprises a pigment containing carbon black as the coloring material (hereinafter referred to as carbon Bk ink in some cases), and the Y, M, and C inks each comprise a dye as the coloring material (hereinafter referred to as dye ink in some cases), as described later. In the ink jet recording apparatus of the present embodiment, the discharge quantity of the carbon Bk ink is set at about 30 pL (picoliter), and the discharge quantities of the Y, M, C dye inks are each set at about 5 pL. Discharge operation is controlled so that these quantities of the inks are discharged for each dot. The following description is on the precondition that the recording apparatus has a recording resolution of 600×600 dpi and uses a common recording medium referred to as plain paper.

A droplet of the Bk ink discharged from the recording head 104 forms one dot in a 1/600-inch square recording area, and droplets of the Y, M, and C color inks form two dots in a 1/600-inch square recording area. These values are varied according to the characteristics of the recording medium 105, even if only plain paper is used. The recording apparatus of the present embodiment is designed according to the characteristics of generally available, widely used recording medium.

Figure 2:
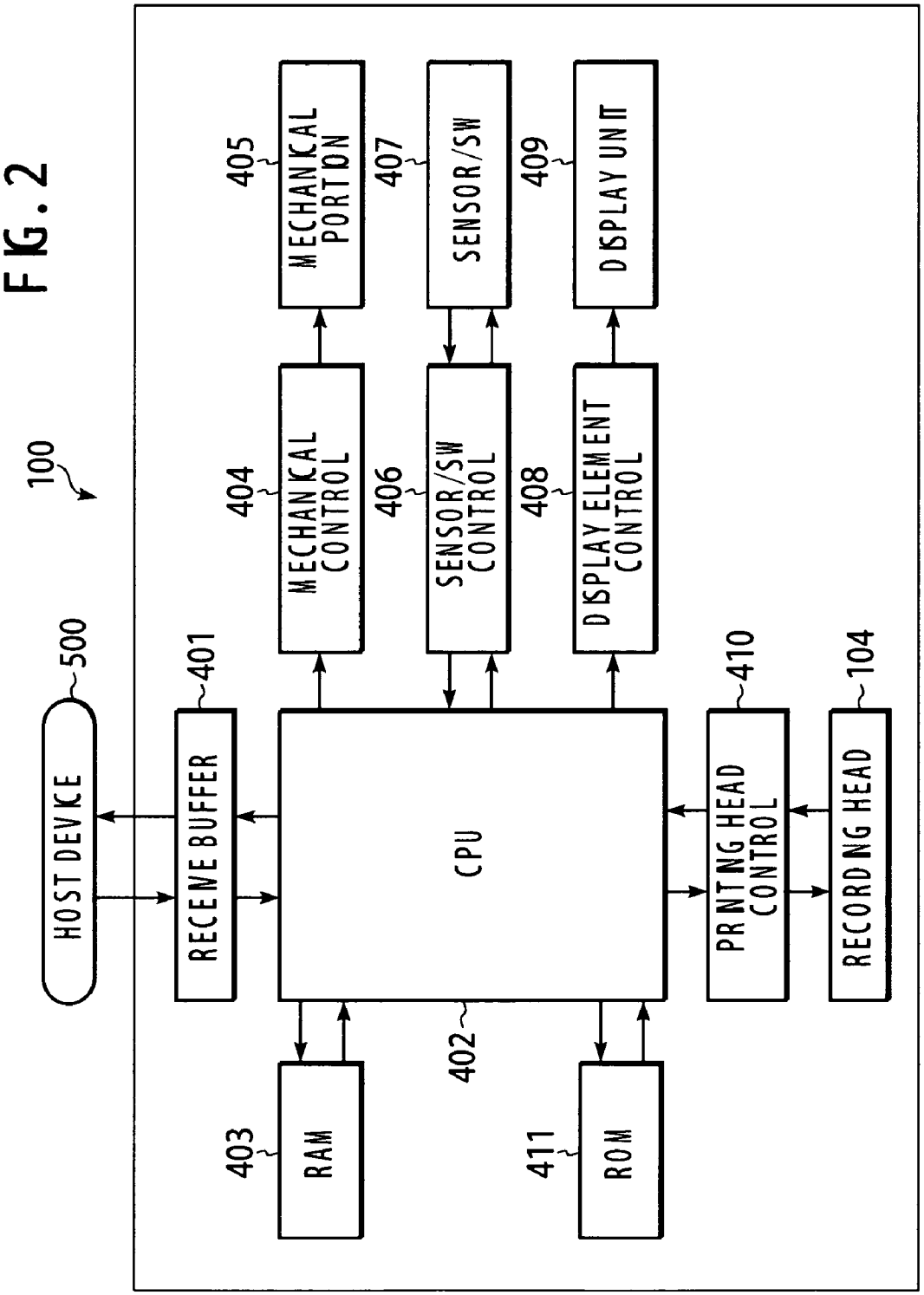
FIG. 2 is a block diagram showing the main part configuration involved in control of the ink jet recording apparatus shown in FIG. 1.

FIG. 2 is a block diagram showing the main part configuration involved in control of the above-described ink jet recording apparatus. Record data of characters and images to be recorded is transmitted to the recording apparatus 100, being the guest device, from a host device 500, and the data is stored in a receive buffer 401. The recording apparatus 100 transmits data for checking whether data is correctly transmitted and for informing of its own operative state to the host device 500. The host device 500 may be a personal computer (PC) or a digital camera that can transmit data to the recording apparatus 100.

The data stored in the receive buffer 401 is processed into data for recording under the control of the CPU 402 while the recording head 104 is scanning in the primary scanning direction, and subsequently stored in a print buffer in a random access memory (RAM) 403. The data in the print buffer is transferred to the recording head 104 by a recording head control 410. The recording head 104 is driven according to the data, thereby discharging the color inks to record images including characters. The recording head control 410 also detects information representing the state of the recording head 104, such as temperature, transmits the information to a CPU 402, and controls the operation of the recording head 104 according to the information.

A mechanical control 404 controls the operation of a mechanical portion 405 including, for example, a carriage motor for shifting the carriage 101 and a line feed motor for delivering the recording medium 105, according to instruction from the CPU 402. A sensor/SW control 406 transmits signals from a sensor/SW portion 407 including various sensors and switches to the CPU 402. A display element control 408 controls a display unit 409 including LEDs or liquid crystal display elements of display panels according to instruction from the CPU 402.

The recording apparatus 100 selects a recording mode from a plurality of recording modes according to the selection input by a user and records images in the selected recording mode. For example, if high-speed recording is desired, a one-pass recording mode is selected; if high-quality recording is desired, a 16-pass recording mode is selected. In the one-pass recording mode, the recording head 104 records an image by scanning once for an identical recording area; in the 16-pass recording mode, the recording head 104 records an image by scanning in the primary scanning direction 16 times for an identical recording area while shifting (that is, delivering the recording medium) in the secondary direction in predetermined distances.

Figure 3:
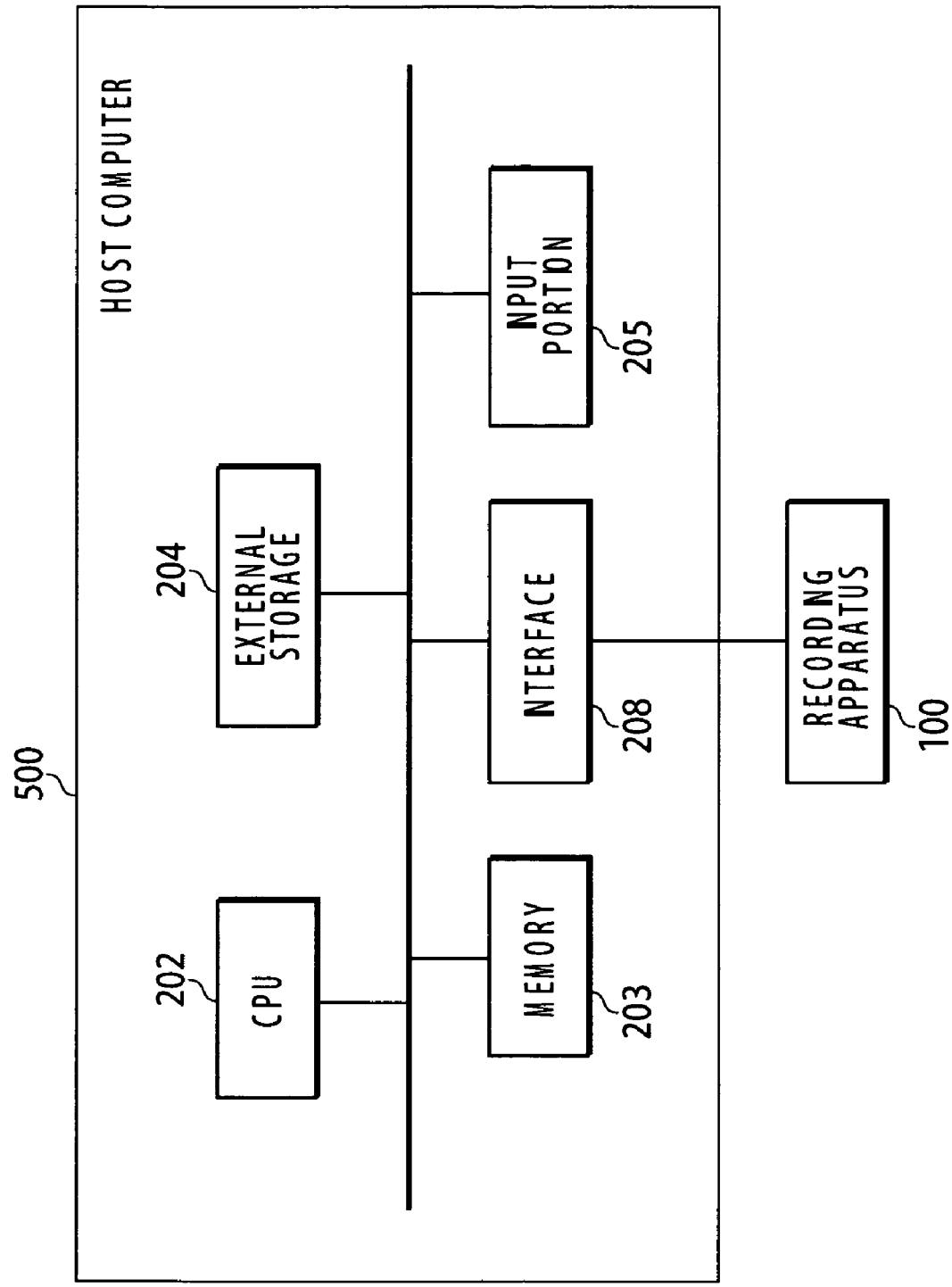
FIG. 3 is a block diagram showing the configuration of a host computer being the host device shown in FIG. 2.

FIG. 3 is a block diagram showing the configuration of the host computer 500 serving as the host device shown in FIG. 2. The host computer 500 and the recording apparatus 100 described with reference to FIG. 2 constitute a recording system.

Figure 4:
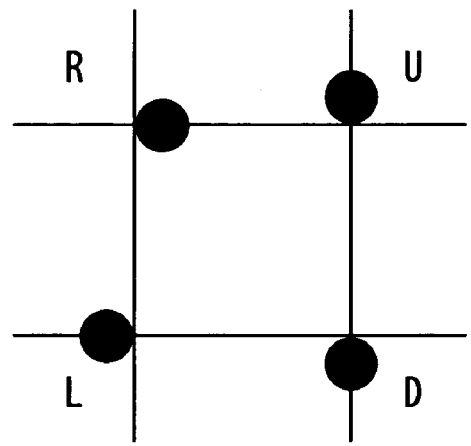
FIG. 4 is a representation of an example of positional information used in the pen input method.

The host computer 500 includes a CPU 202, a memory 203, an external storage 204, an input portion 205, an interface 206 between the host computer 500 and the recording apparatus 100. The CPU 202 performs various types of processing according to programs stored in the memory 203. For example, processing for preparing and editing an image including characters is performed according to a user input from the input portion 205. For recording the image, a print driver, which is one of the programs, prepares Bk data for a carbon Bk ink and CMY data for dye inks, described later with reference to FIG. 5, and synthesizes the data by image processing to prepare recording data used in the recording apparatus 100. Specifically, R, G, and B data of the prepared and edited image are subjected to predetermined image processing, such as color conversion, output γ correction, and quantization (binarization), to yield C, M, and Y binary data. In this data processing, binary data for the carbon Bk ink for recording a black spot pattern, described later with reference to FIG. 4, is obtained. The host computer 500, which is connected to the recording apparatus 100 through the interface 206, transmits recording data obtained by the image processing to the recording apparatus 100 to perform recording.

The programs may be stored in the external storage 204 or supplied from an external device.

FIG. 4 is a representation of an example of positional information used in the pen input method. In the present embodiment, such a pattern image representing positional information is recorded by the recording apparatus 100. Specifically, a positional information image is recorded on a recording medium with the carbon Bk ink, and ordinary images other than the positional information image (hereinafter referred to as other images in some cases) are recorded with C, M, and Y inks.

The positional information is recorded in a predetermined pattern form of black spots dotted, for example, over the entire recordable area on the recording medium 105. Specifically, the black spots are recorded on the recording medium 105 with reference to assumed lattice points arranged at predetermined intervals. For example, a black spot is provided at the vicinity of each of lattice points arranged at intervals of about 0.3 mm. As shown in FIG. 4, there are four recording positions consisting of position U above a lattice point, position D below the lattice point, position R at the right of the lattice point, and position L at the left of the lattice point for each black spot. A positional pattern formed with a predetermined plurality of the black spots constitute "positional information". For example, a pattern of black spots recorded at the vicinities of the respective lattice points in a predetermined two-dimensional arrangement defining a unit region is varied from one unit region to another. Thus, the positional pattern, that is, a combination of above-described positions U, D, R, and L represents the "positional information" of the unit region. As described above, by detecting the black spot pattern with a camera at the end of a pen and reading the positional pattern as positional information for each unit region, the position on a recording medium where the pen point is placed can be known, or it can be made sure that the position where the pen point is placed is in a predetermined region on the recording medium.

In addition, the number of combinations of positions U, D, R, and L allows the positional information to represent a position in a vast virtual plane far beyond the area of a recording medium. For example, if the same positional pattern is not used twice or more for recording media, a positional pattern can identify a recording medium with the positional pattern recorded thereon by establishing correspondences between the positional patterns and the recording media.

If characters or the like are handwritten on a recording medium 105 with such positional information thereon, a pen integrated with a miniature camera (pen camera) may be used. The camera shoots the vicinity of the pen point, thereby reading positional information expressed by the black spots on the recording medium. The positional information helps the pen read images including handwritten characters. Specifically, the positional information indicates the locus of pen movement, thus helping the recognition of the handwritten characters and the like.

In the present invention, in order for the camera to detect the black spot pattern, the pattern is recorded with the carbon Bk ink, and the camera has a structure capable of detecting carbon in the ink on the recording medium 105. The ordinary image other than the black spot pattern is recorded with the Y, M, and C dye inks not containing carbon. Hence, the camera does not detect these dye inks or the image formed with these inks.

Figure 5:
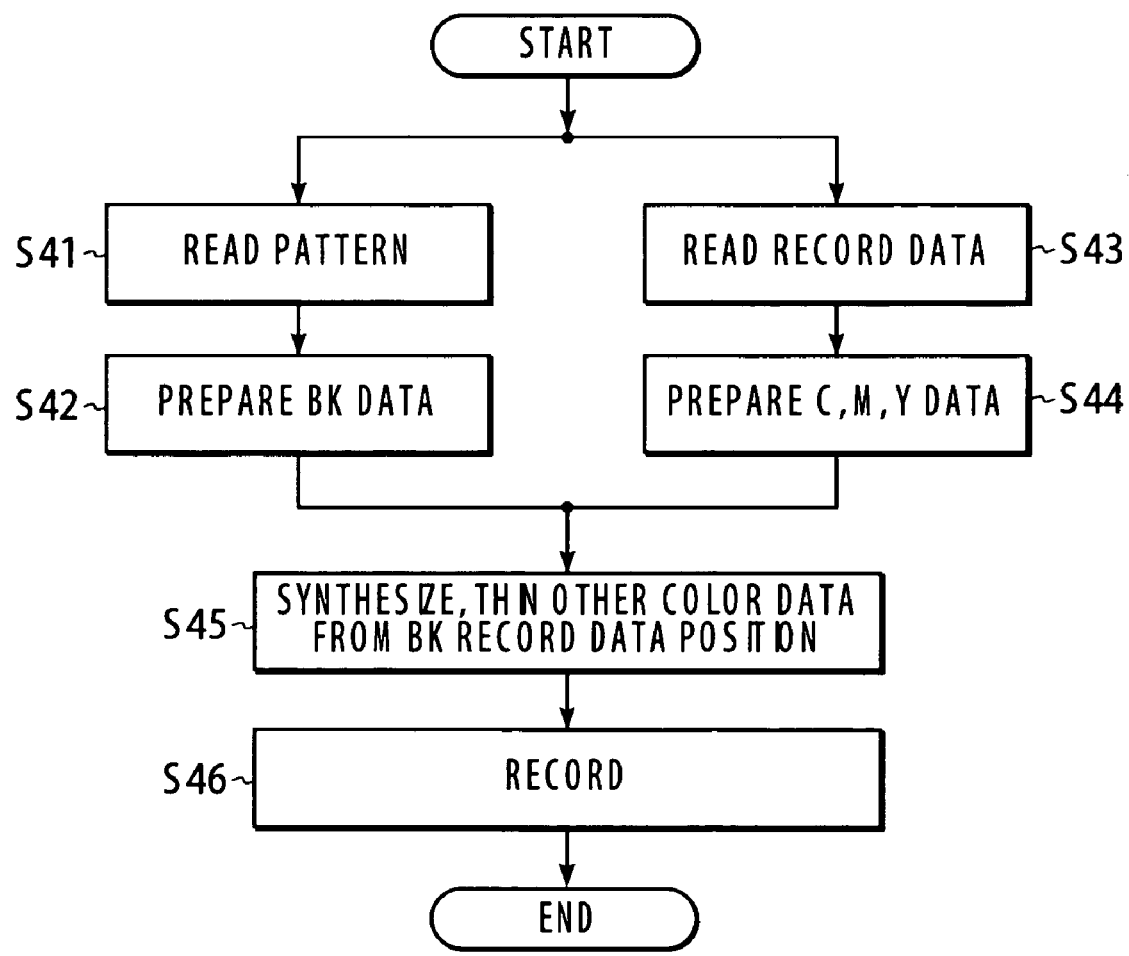
FIG. 5 is a flow chart of a procedure of image processing according to a first embodiment of the present invention.

FIG. 5 is a flow chart of a procedure of image processing according to the first embodiment of the present invention, and, as described above, the image processing is conducted by the print driver in the host computer 500.

A user selects a character or an image to be recorded and presses a record button in the host computer being the host device, thereby starting the image processing. If Bk dots forming the black spot pattern, described above with reference to FIG. 4, and any one of C, M, Y ink dots forming an ordinary image to be recorded other than the black spot pattern overlap with each other, the image-recording dot, that is, the C, M or Y dot, in the overlap is removed. Consequently, waste of ink resulting from the overlap of dots can be prevented, and bleeding between dots recorded with the carbon Bk ink and the other inks can be prevented. Furthermore, cockling of the recording medium resulting from increase of ink applied onto the recording medium can be prevented.

Before the synthesis, Bk binary data (dot data) and CMY binary data (dot data) are prepared in Steps S41 and S42 and Steps 43 and S44, respectively. Specifically, the black spot pattern is read in Step S41. Then, in Step S42, the Bk binary data is prepared according to the read data. For example, if the pattern data is expressed by code data, the data is converted into bit-mapped dot data. On the other hand, record data of the character or the image to be recorded is read in Step S43, and is subjected to color conversion and gamma correction, as described above, and quantization to prepare YMC binary data, in Step S44. Black color in the recorded image is, of course, printed with a mixture of Y, M, and C.

Then, the synthesis is performed in Step S45. Specifically, the Bk data and the CMY data are compared. If these data is such that a Bk dot and any one of the color (C, M, and Y) dots are provided in the same position, the color data is converted such that color ink dots are not provided in the same positions as Bk dots. In this conversion, color data to be recorded is processed into data not to be recorded, that is, thinning is performed. As an example of the thinning, color data is processed into the conjunction of the color data and "not (Bk data)".

If the resolutions, or the densities of dot arrangement, of the Bk data and the color data are different, the thinning is performed on the basis of the resolution of the Bk data. For example, for a Bk data resolution of 600 dpi×600 dpi and a color data resolution of 1200 dpi×600 dpi, the Bk data is processed with the color data corresponding to the positions where Bk dots are formed.

Figure 6A:
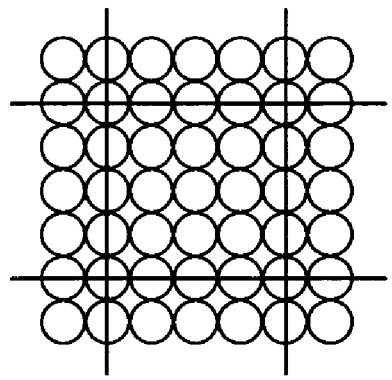
FIGS. 6A to 6E are representations of dot arrangement and thinning of color dots when a black spot pattern representing positional information and a color image are recorded.
Figure 6B:
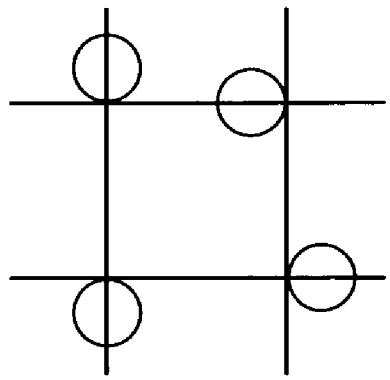
Figure 6C:
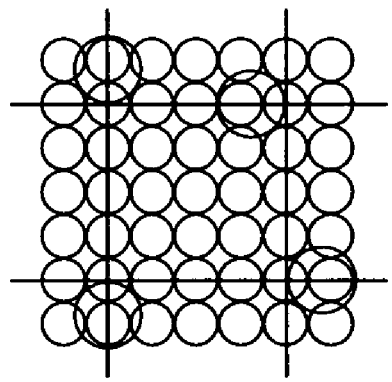

FIG. 6A shows color dots to be recorded; FIG. 6B shows Bk dots forming a black spot pattern representing positional information; and FIG. 6C shows a combination of color dots and Bk dots.

Figure 6D:
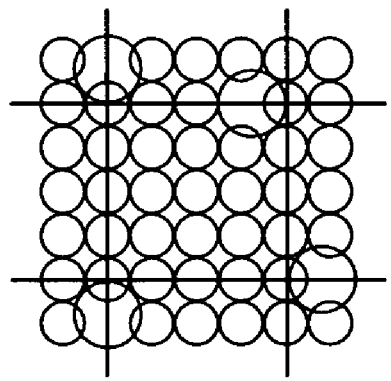
Figure 6E:
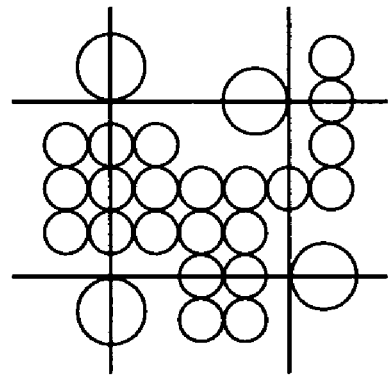

In the present embodiment, by performing synthesis with conjunction operation, as described above, color dots provided in the same positions as the Bk dots are removed to thin out the color dots. FIG. 6D shows dots to be recorded after thinning the dots shown in FIG. 6A according to the above-described conditions.

Thus, color dots overlapping with Bk dots, which do not appear because the Bk dots are strongly expressed, are not formed. Thus, waste of ink is prevented.

If Bk dots and dots of the other colors are provided in the same positions on a recording medium, bleeding can occur between the Bk ink and the adjacent color inks to negatively affect dot forms. The present embodiment advantageously prevents this problem.

Furthermore, color recording reduces ink discharge quantity per unit area of a recording medium, consequently preventing the recording material from cockling.

On completion of preparation of record data, the record data is transmitted to the recording apparatus 100 in Step S46.

In the embodiment above, the C, M, and Y inks are used as the color inks. However, the color inks are not limited to these, and a black ink may be used in addition to the C, M, and Y inks.

The black spot pattern and the other image may be recorded by the same scanning operation or separate.

In the embodiment above, the preparation of record data including the synthesis of the Bk data and the Y, M, and C data, shown in FIG. 5, is performed in the host device of the recording apparatus, more specifically, a PC. However, it is not limited to this, and, for example, the recording apparatus may prepare or synthesize the Bk data and the Y, M, and C data. The device for preparing Bk data and Y, M, and C data, shown in FIG. 5, is herein referred to as "image processing apparatus".

Second Embodiment

In the first embodiment, color dots in the same positions as Bk dots are removed, but it is not limited to this. Actual dots are not out of round, but their mean diameter is larger than the dot pitch in a dot arrangement. Consequently, color dots adjacent to a Bk dot may come into contact with the Bk dot. Accordingly, in the second embodiment, color dots in the same positions as the Bk dots and the dots adjacent to the positions in the vertical, horizontal, and diagonal directions are removed to thin out the color dots.

Specifically, the following operation is performed by synthesis in Step S55 shown in FIG. 7 (the remaining steps of FIG. 7 are similar to those of FIG. 5).

In this operation, Bk data that is binary data designating whether dots are recorded is processed. First, disjunction operation of Bk data and data one dot right-shifted and left-shifted from the Bk data are performed. The resulting data and data one dot upper-shifted and lower-shifted from the resulting data are subjected to disjunction operation. The obtained data is denoted as BkT. The conjunction of color data and "not (BkT)" is set to be color data, and, thus, the thinning is carried out.

Third Embodiment

A third embodiment is intended to reduce the duty of color data other than Bk data. Specifically, by uniformly reducing the color dot duty in a predetermined area including Bk dots, the probability of overlapping or adjoining of Bk dots and color dots is reduced. Thus, the same effects as in the foregoing embodiments are produced.

Preparation of inks used in the embodiments will now be described.

1. Carbon Bk Ink: Bk Ink (First Embodiment), Bk1 ink (second embodiment)

Disperse pigment 1

After 10 g of carbon black having a specific surface area of 260 $m^2/g$ and a DBP absorption of 115 mL/100 g and a 2.5 g of p-aminobenzoic acid are mixed with 72 g of water, 1.62 g of nitric acid is added to the mixture, followed by stirring at 70° C. After a few minutes, a solution containing 1.07 g of sodium nitrite dissolved in 5 g of water is added to the mixture, followed by stirring for another one hour. The resulting slurry is filtered through a Toyo Roshi No. 2 filter paper (produced by Advantis K.K.). The collected pigment particles are thoroughly washed with water and are dried in an oven at 90° C. Water is added to the pigment to yield a disperse pigment containing 10 percent by weight of the pigment. Thus, a group expressed by the following formula is introduced to the surfaces of the carbon black.

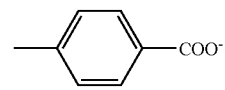

Carbon Bk Ink

The following ingredients are mixed and sufficiently stirred. Then, the mixture is filtered through a microfilter with a pore size of 3.0 μm (produced by Fuji Photo Film Co., Ltd.) under an increased pressure to prepare the black ink 1.
 disperse pigment 1 described above: 30 parts
 ammonium benzoate: 1 part
 trimethylolpropane: 6 parts
 glycerin: 5 parts
 diethylene glycol: 5 parts
 ethylene oxide adduct of acetylene glycol (Product name: Acetylenol EH): 0.15 part
 water: 52.85 parts 2. Dye inks Y (Yellow Ink)

The following ingredients are mixed and sufficiently stirred. Then, the mixture is filtered through a microfilter with a pore size of 0.2 μm (produced by Fuji Photo Film Co., Ltd.) under an increased pressure to prepare the yellow ink.
 ethylene oxide adduct of acetylene glycol (Product name: Acetylenol EH): 1 part
 diethylene glycol: 10 parts
 glycerin: 5 parts
 CI Direct Yellow 86: 3 parts
 water: 81 parts M (magenta ink)

The following ingredients are mixed and sufficiently stirred. Then, the mixture is filtered through a microfilter with a pore size of 0.2 μm (produced by Fuji Photo Film Co., Ltd.) under an increased pressure to prepare the magenta ink.
 ethylene oxide adduct of acetylene glycol (Product name: Acetylenol EH): 1 part
 diethylene glycol: 10 parts
 glycerin: 5 parts
 CI Acid Red 35: 3 parts
 water: 81 parts C (cyan ink)

The following ingredients are mixed and sufficiently stirred. Then, the mixture is filtered through a microfilter with a pore size of 0.2 μm (produced by Fuji Photo Film Co., Ltd.) under an increased pressure to prepare the cyan ink.
  ethylene oxide adduct of acetylene glycol (Product name: Acetylenol EH): 1 part
  diethylene glycol: 10 parts
  glycerin: 5 parts
  C. I. Acid Blue 9: 3 parts
  water: 81 parts Bk2 (black ink)

The following ingredients are mixed and sufficiently stirred. Then, the mixture is filtered through a microfilter with a pore size of 0.2 μm (produced by Fuji Photo Film Co., Ltd.) under an increased pressure to prepare the black ink.
  ethylene oxide adduct of acetylene glycol (Product name: Acetylenol EH): 1 part
  diethylene glycol: 10 parts
  glycerin: 5 parts
  CI Food Black 2: 3 parts
  water: 81 parts Modifications The positional information is recorded with the carbon-containing Bk ink according to the pen input method using a carbon-detectable camera integrated with a pen, in the foregoing embodiments. However, the recording material for the positional information is not limited to the carbon-containing Bk ink, and any recording material may be used as long as a pen camera can detect it. For example, ink containing a fluorescent dye may be used instead of the carbon-containing Bk ink. In this instance, diaminostilbenesulfonic acid derivatives can be used because diaminostilbenes exhibit fluorescent characteristics. For the pen camera, a high-sensitive sensor capable of detecting ultraviolet wavelength or a filter may be used. In this instance, by recording the positional information with a bright color material, quality degradation of images including characters can be prevented. In view of image quality, the positional information recorded with the carbon-containing Bk ink may negatively affect the quality of images to be recorded including characters to some extent because the positional information is reflected as particles in human eyes, even though it is expressed by miniature dots (black spots).

The embodiments are described using an ink jet recording apparatus as a recording apparatus, but it is not limited to this. Recording in which the black spot pattern is formed with a carbon-containing material and the other colors is formed with carbon-free materials can produce the same effects.

Other Modifications

As described above, the present invention may be applied to a system including a plurality of apparatuses, such as a host computer, an interface device, a reader, and a printer, or a single apparatus, such as a copier or a fax machine.

In the present invention, the functions of the embodiments may be realized by an apparatus or system including various devices and a computer (CPU or MPU) connected with the devices. In this apparatus or system, program codes of software for realizing the functions, as shown in FIGS. 5 and 7, are supplied to the computer, and the devices are operated according to a program stored in the computer.

In this instance, the program codes of the software realize the functions. The program codes and means for supplying the codes to the computer, for example, a recording medium containing the program codes, are in part of the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for recording, on one recording medium, an image and a positional information image, using a recording apparatus that applies a recording material onto the recording medium, the method comprising:
  a step of obtaining dot data of a color material forming the positional information image, according to record data for recording the positional information image, wherein the positional information image includes information designating positions where positional information is recorded on the recording medium;
  a conversion step of converting dot data of a color material forming said image so that the dot density of said image is reduced when a position of the dot data forming said image and a position of the dot data forming said positional information image overlap, on the basis of the dot data of the color material forming the positional information; and
  a recording step of recording the images on the recording medium, according to the record data of the positional information image and the converted data of said image.

2. A method according to claim 1, wherein in the conversion step, dots of said image provided in positions where the dots of the positional information image are provided are removed to reduce the dot density of said image.

3. A method according to claim 1, wherein in the conversion step, dots of said image in and adjacent to positions where the dots of the positional information image are provided are removed to reduce the dot density of said image.

4. A method according to claim 1, wherein in the conversion step, the duty of the dots of said image provided in a predetermined area adjacent to the dots of the positional information image is reduced to reduce the dot density of said image.

5. A method according to claim 1, wherein in the recording step, the color material forming the positional information image contains carbon black.

6. A recording system for recording an image and a positional information image on one recording medium, the system comprising:
  a recording apparatus for performing recording by applying a recording material onto the recording medium according to image data;
  a transmitter for transmitting the image data to the recording apparatus;
  acquisition means for obtaining dot data of a color material forming the positional information image, according to record data for recording the positional information image, wherein the positional information image includes information designating positions where positional information is recorded on the recording medium; and conversion means for converting dot data of a color material forming said image so that the dot density of said image is reduced when a position of the dot data forming said image and a position of the dot data forming said positional information image overlap, on the basis of the dot data of the color material forming the positional information.

7. A system according to claim 6, wherein in the conversion means, dots of said image provided in positions where the dots of the positional information image are provided are removed to reduce the dot density of said image.

8. A system according to claim 6, wherein in the data converting means, dots of said image in and adjacent to positions where the dots of the positional information image are provided are removed to reduce the dot density of said image.

9. A system according to claim 6, wherein in the data converting means, the duty of the dots of said image provided in a predetermined area adjacent to the dots of the positional information image is reduced to reduce the dot density of image.

10. A system according to claim 6, wherein the recording apparatus is capable of recording an image with a color material containing carbon black, and the dots of the positional information image are recorded with the color material containing carbon black.

11. An image processing apparatus for recording an image by applying a recording material onto a recording medium, the image processing apparatus performing processing for recording, on one recording medium, a positional information image and the image, the image processing apparatus comprising:

acquisition means for obtaining dot data of a color material forming the positional information image, according to record data for recording the positional information image, wherein the positional information image includes information designating positions where positional information is recorded on the recording medium; and data processing means for processing dot data of a color material forming said image so that the dot density of said image is reduced when a position of the dot data forming the image and a position of the dot data forming the positional information image overlap, on the basis of the dot data of the color material forming the positional information.

12. An image processing apparatus according to claim 11, wherein in the data processing means, dots of said image provided in positions where the dots of the positional information image are provided are removed to reduce the dot density of said image.

13. An image processing apparatus according to claim 11, wherein in the data processing means, dots of said image in and adjacent to positions where the dots of the positional information image are provided are removed to reduce the dot density of said image.

14. An image processing apparatus according to claim 11, wherein in the data processing means, the duty of the dots of said image provided in a predetermined area adjacent to the dots of the positional information image is reduced to reduce the dot density of said image.

15. An image processing apparatus according to claim 11, wherein the image processing apparatus is capable of recording an image with a color material containing carbon black, and the dots of the positional information image are recorded with the color material containing carbon black.

* * * * *